United States Patent [19]
Martin

[11] Patent Number: 4,924,230
[45] Date of Patent: May 8, 1990

[54] SEARCH DETECTION APPARATUS

[75] Inventor: Raymond G. Martin, Ellicott City, Md.

[73] Assignee: The United States of America as represented by the Secretary of the Air Force, Washington, D.C.

[21] Appl. No.: 323,577

[22] Filed: Mar. 14, 1989

[51] Int. Cl.⁵ .............................................. G01S 13/00
[52] U.S. Cl. ...................................... 342/90; 342/149
[58] Field of Search ................................. 342/149, 90

[56] References Cited
U.S. PATENT DOCUMENTS

| | | | |
|---|---|---|---|
| 3,212,089 | 10/1965 | Longacre et al. | 342/149 |
| 3,378,844 | 4/1968 | Zurcher | 342/149 |
| 3,618,093 | 11/1971 | Dickey, Jr. | 342/149 |
| 3,720,941 | 3/1973 | Ares | 342/149 X |
| 4,210,912 | 7/1980 | Naidich et al. | 342/149 X |
| 4,334,224 | 6/1982 | Gordon | 343/6.5 R |
| 4,568,940 | 2/1986 | Diamond | 343/16 M |
| 4,739,327 | 4/1988 | Konig et al. | 342/26 |

Primary Examiner—Thomas H. Tarcza
Assistant Examiner—Mark Hellner
Attorney, Agent, or Firm—William Stepanishen; Donald J. Singer

[57] ABSTRACT

A radar search detection apparatus having a monopulse antenna to receive sum and difference beam signals which are applied to separate target detection channels to detect and identify target returns.

3 Claims, 1 Drawing Sheet

SEARCH DETECTION APPARATUS

STATEMENT OF GOVERNMENT INTEREST

The invention described herein may be manufactured and used by or for the Government for governmental purposes without the Payment of any royalty thereon.

BACKGROUND OF THE INVENTION

The present invention relates broadly to a search radar apparatus, and in particular to improved search detection channels for search radar using a monopulse antenna.

The state of the art of search radar apparatus using monopulse antennas is well represented and alleviated to some degree by the prior art apparatus and approaches which are contained in the following U.S. Patents:

U.S. Pat. No. 4,334,224 issued to Gordon on June 8, 1982;

U.S. Pat. No. 4,568,940 issued to Diamond on Feb. 8, 1986; and

U.S. Pat. No. 4,739,327 issued to Konig et al on Apr. 19, 1988.

The Gordon patent discloses a secondary surveillance radar which is arranged to monitor the relative amplitudes of sum signals and difference signals that are received from a target in response to interrogations. Only those sum signals for which the sum signal exceeds the difference signal by a predetermined amplitude are accepted as valid to avoid degradation of the performance of the radar.

The Diamond patent is directed to dual-mode radar receiver that processes sum and difference signals which are generated from received radar signals to provide target angle information in terms of amplitude or phase.

The Konig et al patent describes the method and the apparatus for suppressing rain echoes in a terrain tracking radar with elevation monopulse devices. The signal in the difference channel is amplified by a predetermined factor and compared with the level of the sum signal to determine the presence of a ground echo or a rain echo.

In the prior art, it was the practice in search radars using monopulse antennas and having sum and difference beams, to perform the search function using the sum beam alone, and to employ the difference beam(s) only to obtain angle data on detected targets. The novel concept of the present invention is to provide search detection channels for both the sum and the difference beam(s) on receive, while using the sum beam for transmit as usual. This new approach extends the angular coverage of the antenna, typically by approximately twenty-five percent.

SUMMARY OF THE INVENTION

The present invention utilizes separate sum and difference beam search detection channels in a monopulse radar receiver to extend and improve the opportunities for target detection.

It is one object of the present invention, therefore, to provide an improved search detection apparatus for a monopulse radar receiver.

It is another object of the invention to provide an improved search detection apparatus wherein two separate search detection channels are utilized for target detection.

It is still another object of the invention to provide an improved search detection apparatus wherein the sum and difference beams are utilized to enhance target detection.

It is a further object of the invention to provide an improved search detection apparatus wherein the angular coverage of the antenna is extended by approximately twenty five percent.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
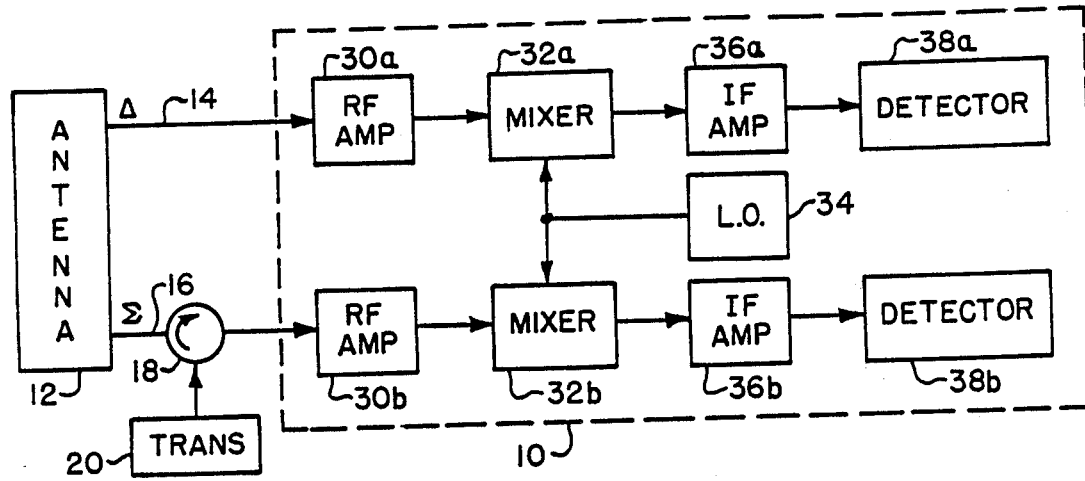
FIG. 1 is a block diagram of the improved search detection apparatus in a radar receiver utilizing a monopulse antenna according to the present invention; and, FIG. 2 is a graphical representation of the two-way antenna gain patterns for a monopulse antenna.

Referring now to FIG. 1, there is shown a radar receiver unit 10 operatively connected to a monopulse antenna unit 12. A $\Delta$ channel 14 and a $\Sigma$ channel 16 connect, respectively, the sum ($\Sigma$) and difference beams of the monopulse antenna unit 12 to the radar receiver unit 10. The $\Sigma$ channel 16 has a circulator unit 18 connected between the antenna unit 12 and the radar receiver unit 10. A transmitter unit 20 which is connected to the circulator unit 18, provides a sum beam to the antenna unit 12 for transmission. The sum ($\Sigma$) and difference ($\Delta$) beams which are received by the monopulse antenna unit 10 are, respectively, applied to the sum ($\Sigma$) and difference ($\Delta$) channels of the radar receiver unit 10 for target detection.

In the radar receiver unit 10, the sum ($\Sigma$) and difference ($\Delta$) channels are essentially identical. Each channel ($\Sigma$ and $\Delta$) comprises respectively, an RF amplifier unit 30a, 30b, which is connected to a mixer unit 3a, 32b. Each mixer unit 32a, 32b receives an intermediate frequency signal from a local oscillator unit 34. The output signal from the mixer units 32a, 32b are respectively applied to the intermediate frequency amplifier units 36a, 36b. The output signals from the intermediate amplifier units 36a, 36b are respectively applied to the detector units 38a, 38b in which target detection occurs.

Figure 2:
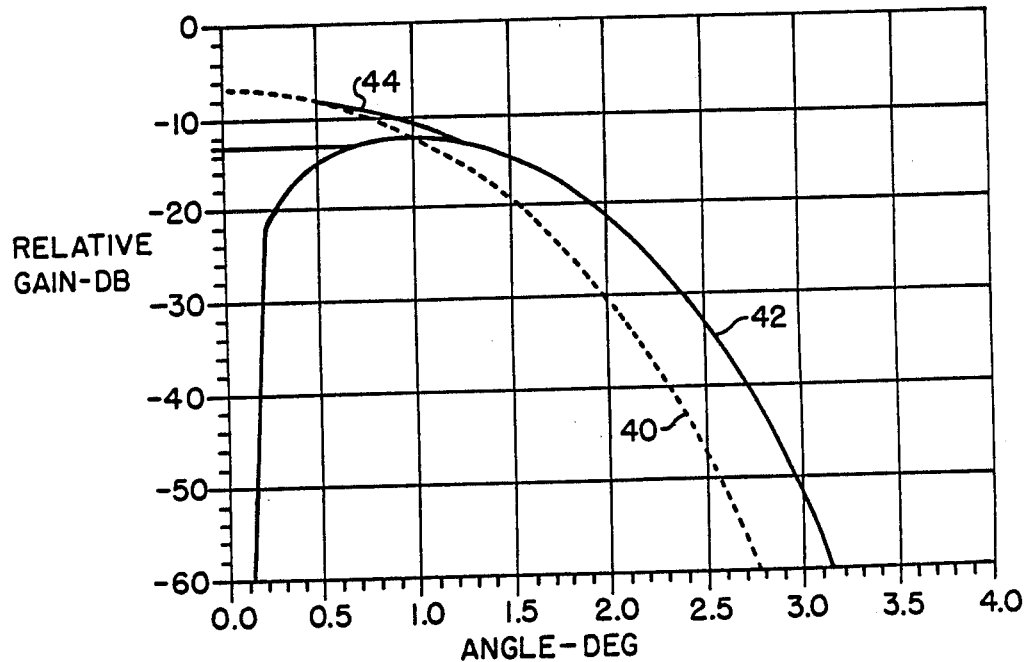

Turning now to FIG. 2, there is shown a graphical representation of the improvement in target detection that is achieved by utilizing the sum and difference beams in separate receiver channels in a radar receiver for target detection. The two way antenna gain patterns for a monopulse antenna are shown and represented by the sum beam pattern 40 and the difference beam pattern 42. The two-way 6 dB beamwidth of the sum channel alone is 2 degrees. However, when the effects of also detecting in the difference beam are taken into account, the effective beamwidth is extended to 2.5 degrees, with the same peak gain.

The effective gain at the point where the two two-way patterns cross (the composite 44 is represented by the heavy line) is increased over that of either beam alone because there are two opportunities for detection, since there are independent noise sources in the sum and difference channel receivers. In the worst case of a Sw.

1 target model the detectability improvement at the cross-over point is approximately 1 dB at detection probabilities of interest (e.g. $P_d=0.8$). It should be noted that the effective noise in the sum and difference channels are uncorrelated regardless of whether the noise sources are receiver thermal noise alone, or the effects of multiple sidelobe jammers, since the sidelobe pattern structure of the antenna sum and difference beams are typically substantially different. As a result the composite effective detection pattern of the sum and difference beams combined is approximately as shown by the solid curve 44 in FIG. 2. It may be noted that the effective beamwidth is increased by twenty-five percent over that of the sum beam alone.

The twenty-five percent increase in angular coverage for a single beam when considered in relation to search coverage of a large volume, is equivalent to a 1 dB increase in power-aperture product. The use of two, rather than one, detection channels doubles the number of opportunities for false alarm, equivalent to approximately 0.2 dB loss. The net benefit is, therefore, approximately 0.8 dB. When the approach is used in two dimensions (e.g. azimuth and elevation) the overall benefit is thus equivalent to 1.6 dB.

Although the invention has been described with reference to a particular embodiment, it will be understood to those skilled in the art that the invention is capable of a variety of alternative embodiments within the spirit and scope of the appended claims.

What is claimed is:

1. A radar search detection apparatus for detecting a target, comprising in combination:
   a directional antenna to receive a return signal from said target, said target return signal includes a sum signal and a difference signal, and,
   a radar receiver operatively connected to said antenna to receive said sum signal and said difference signal, said radar receiver having a first and a second target detection channel, said first target detection channel receiving said sum signal, said second target detection channel receiving said difference signal, said first and second target detection channels independently processing their respective signals to independently detect said target.

2. A radar search detection apparatus as described in claim 1 wherein said directional antenna comprises a monopulse antenna.

3. A radar search detection apparatus as described in claim 1 wherein said first and second detection channels respectively comprise:
   an RF amplifier unit to receive said target return signal from said antenna,
   a mixer unit receiving a local oscillator signal, said mixer unit receiving said target return signal from said RF amplifier unit and converting it to an IF signal,
   an IF amplifier unit receiving said IF signal from said mixer unit, and
   a detector unit receiving said IF signal from said IF amplifier unit, said detector unit processing said IF signal to detect a target return therein.

* * * * *